United States Patent
Iiyama

(10) Patent No.: US 7,075,101 B2
(45) Date of Patent: Jul. 11, 2006

(54) METHOD OF AND APPARATUS FOR MANAGING IMAGE RECORDING MEDIUM

(75) Inventor: Tatsuo Iiyama, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 294 days.

(21) Appl. No.: 10/803,893

(22) Filed: Mar. 19, 2004

(65) Prior Publication Data

US 2004/0183039 A1   Sep. 23, 2004

(30) Foreign Application Priority Data

Mar. 20, 2003   (JP)   ............... 2003-078465

(51) Int. Cl.
*G01N 23/04* (2006.01)

(52) U.S. Cl. .................. 250/589; 250/580; 250/581; 250/582

(58) Field of Classification Search ................ 250/589, 250/580, 581, 582
See application file for complete search history.

(56) References Cited

U.S. PATENT DOCUMENTS

| | | | | |
|---|---|---|---|---|
| 5,130,739 A | * | 7/1992 | O'Such et al. | 396/63 |
| 5,418,355 A | * | 5/1995 | Weil | 235/375 |
| 5,865,745 A | * | 2/1999 | Schmitt et al. | 600/407 |
| 6,431,440 B1 | * | 8/2002 | Tsuchino | 235/380 |
| 6,556,698 B1 | * | 4/2003 | Diano et al. | 382/132 |
| 2002/0060302 A1 | | 5/2002 | Aonuma | |
| 2003/0002748 A1 | | 1/2003 | Funahashi | |
| 2005/0205813 A1 | * | 9/2005 | Ishikawa | 250/584 |
| 2005/0227154 A1 | * | 10/2005 | Motoki | 430/22 |

FOREIGN PATENT DOCUMENTS

| | | |
|---|---|---|
| JP | 63-253348 A | 10/1988 |
| JP | 01-097945 A | 4/1989 |
| JP | 2-58614 B2 | 12/1990 |
| JP | 2002-157585 A | 5/2002 |
| JP | 2002-306425 A | 10/2002 |

* cited by examiner

*Primary Examiner*—Otilia Gabor
*Assistant Examiner*—Christine Sung
(74) *Attorney, Agent, or Firm*—Sughrue Mion, PLLC

(57) ABSTRACT

The type information of stimulable phosphor sheets is read from cassettes which store the stimulable phosphor sheets in cassette storage apparatus, and storage position information of the stimulable phosphor sheets is acquired. When subject information is set by ID terminals, a cassette having the type information that matches the subject information is selected from the cassette storage apparatus, and supplied to radiation image capturing apparatus. With respect to a stimulable phosphor sheet on which radiation image information has been recorded, the subject information is set in relation to identification information of the stimulable phosphor sheet.

19 Claims, 6 Drawing Sheets

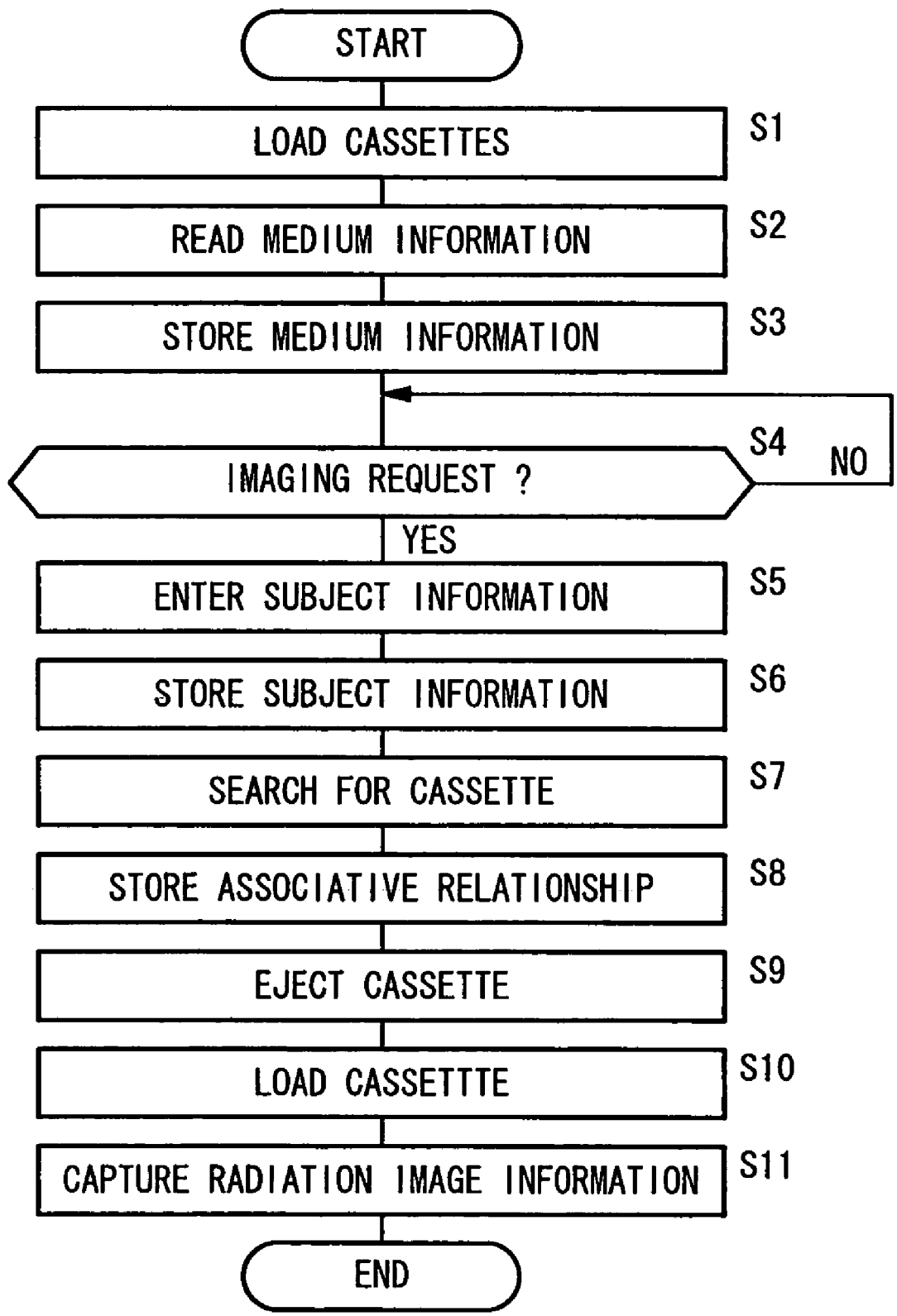

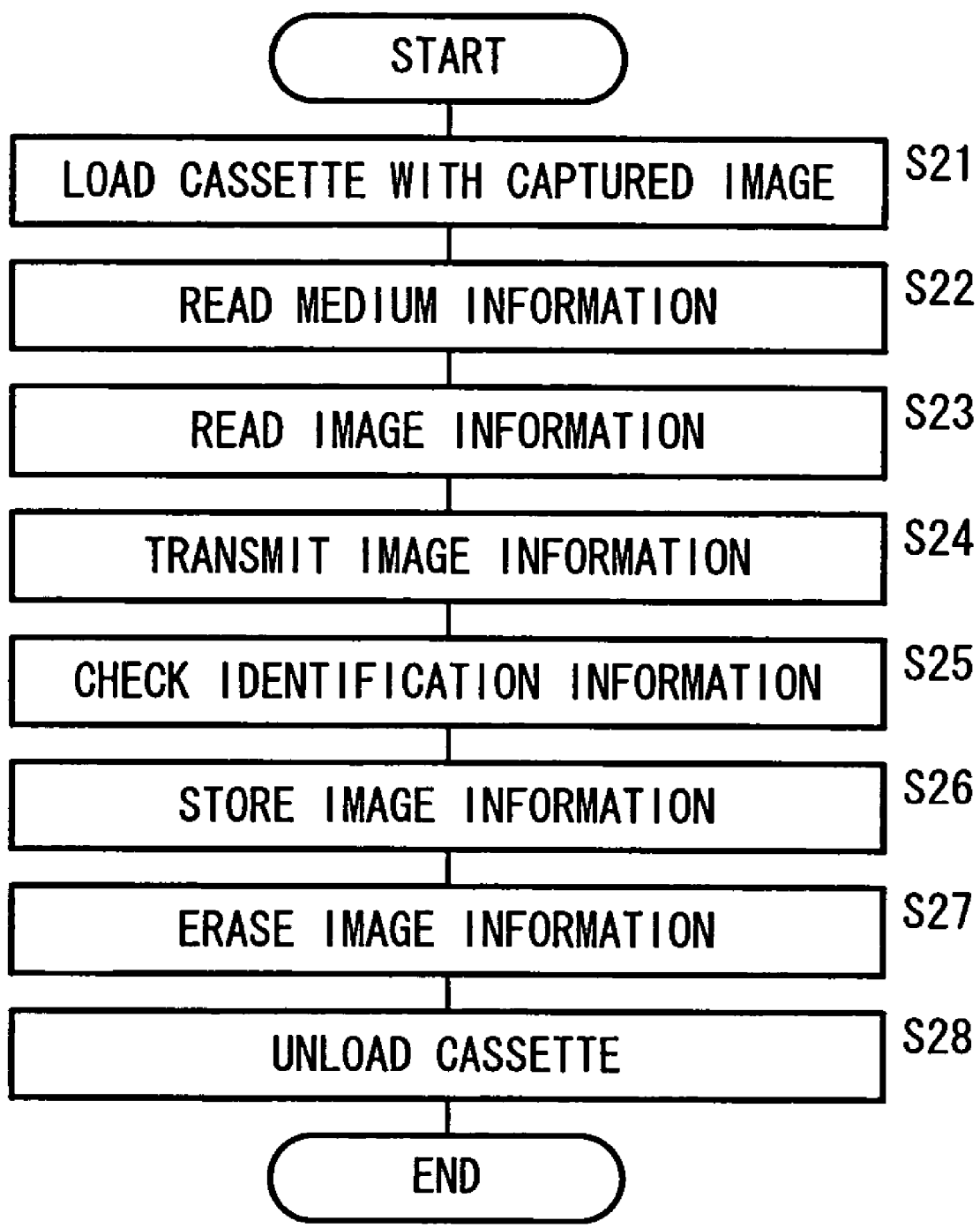

METHOD OF AND APPARATUS FOR MANAGING IMAGE RECORDING MEDIUM

BACKGROUND OF THE INVENTION

1. Field of the Invention

The present invention relates to a method of and an apparatus for selecting an image recording medium that matches subject information and managing the associative relationship between the subject information and the selected image recording medium.

2. Description of the Related Art

In the medical field, there are widely employed radiation image information recording and reading systems that employ a stimulable phosphor which, when exposed to an applied radiation (X-rays, α-rays, β-rays, γ-rays, electron beams, ultraviolet radiation, or the like), stores a part of the energy of the radiation, and, when subsequently exposed to applied stimulating rays such as a laser beam, visible light, or the like, emits light in proportion to the stored energy of the radiation (see Japanese laid-open patent publication No. 63-253348 for details).

In the radiation image information recording and reading systems, the radiation image information of a subject such as a patient is recorded on a sheet of a stimulable phosphor by an image recording apparatus, and then the sheet is supplied to and read by an image reading apparatus to obtain radiation image information that can easily be processed and managed.

Stimulable phosphor sheets for recording radiation image information are usually available in different sizes and sensitivities depending on imaging conditions including the regions to be imaged, ages, imaging purposes, etc. of patients. The operator of the system chooses a stimulable phosphor sheet that matches the imaging conditions of a patient to be imaged, and operates the system to record a radiation image of the patient on the chosen stimulable phosphor sheet.

Items of radiation image information recorded on respective stimulable phosphor sheets need to be managed in exact association with the patients who have given the radiation image information. According to one proposed system, a registration device disposed near the image recording apparatus registers patient's information including the name, gender, date of birth, ID number, etc. of a patient whose radiation image information is recorded on a stimulable phosphor sheet by the image recording apparatus, and also registers medium information recorded on a bar code attached to the stimulable phosphor sheet. Then, the image reading apparatus reads the bar code on the stimulable phosphor sheet, and seeks a match between the patient information and the medium information of the stimulable phosphor sheet which have been acquired from the registration device (see Japanese laid-open patent publication No. 2002-157585 for details).

The operator has to manually select a stimulable phosphor sheet that matches the imaging conditions of a patient to be imaged from a storage for stimulable phosphor sheets, and supply the selected stimulable phosphor sheet to the image recording apparatus. At this time, the operator may possibly make a mistake in the choice of the stimulable phosphor sheet. For matching the patient information and the medium information of the stimulable phosphor sheet, the operator has to perform a tedious and time-consuming process of reading the bar code on the stimulable phosphor sheet to acquire the medium information thereof before radiation image information is recorded on the stimulable phosphor sheet by the image recording apparatus and the recorded radiation image information is read from the stimulable phosphor sheet by the image reading apparatus.

SUMMARY OF THE INVENTION

It is a general object of the present invention to provide a method of and an apparatus for managing an image recording medium to allow an image recording medium that matches a subject to be selected and supplied easily and accurately to an image recording apparatus.

Another object of the present invention is to provide a method of and an apparatus for managing an image recording medium to allow an associative relationship between a subject and an image recording medium which has recorded image information of the subject to be easily and accurately managed.

Still another object of the present invention is to provide a method of and an apparatus for managing an image recording medium to allow an associative relationship between a subject and an image recording medium without posing an undue burden on the operator.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a flowchart of a processing sequence of the radiation image capturing apparatus, the cassette storage apparatus, and the information managing apparatus of the radiation image information recording and reading system; and FIG. 6 is a flowchart of a processing sequence of the radiation image reading apparatus and the information managing apparatus of the radiation image information recording and reading system.

DESCRIPTION OF THE PREFERRED EMBODIMENT

Figure 1:
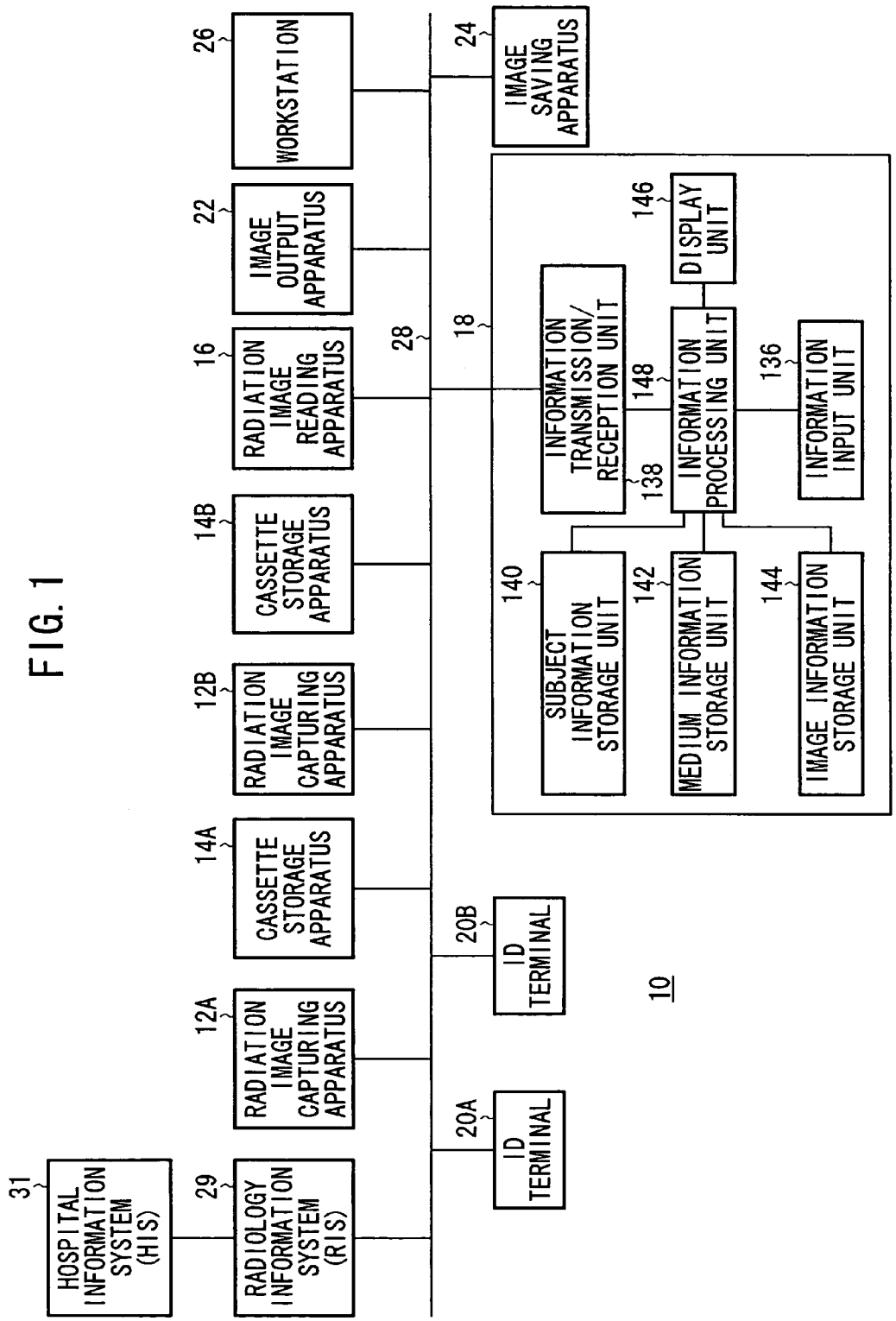
FIG. 1 is a block diagram of a radiation image information recording and reading system according to an embodiment of the present invention.

FIG. 1 shows in block form a radiation image information recording and reading system 10 according to an embodiment of the present invention.

As shown in FIG. 1, the radiation image information recording and reading system 10 comprises radiation image capturing apparatus 12A, 12B (image recording apparatus) for capturing radiation image information of a subject M (see FIG. 2), cassette storage apparatus 14A, 14B (image recording medium storages) disposed closely to the radiation image capturing apparatus 12A, 12B, a radiation image reading apparatus 16 (image reading apparatus) for reading radiation image information, an information managing apparatus 18 for entering subject information about the subject M and managing radiation image information, ID terminals 20A, 20B having a function to enter the subject information, an image output apparatus 22 for outputting radiation image information, an image saving apparatus 24 for saving radiation image information, and a workstation 26 browsing radiation image information that has been saved. These components of the radiation image information recording and reading system 10 are interconnected by a network 28.

To the network 28, there is also connected a radiology information system (RIS) 29 for generally managing, in the department of radiology at a hospital, diagnostic image information including radiation image information handled in the department of radiology and other information. The radiology information system 29 is managed by a hospital information system (HIS) 31 connected in a higher level thereto, and receives inspection requests from the hospital information system 31 and sends inspection results to the hospital information system 31.

Figure 2:
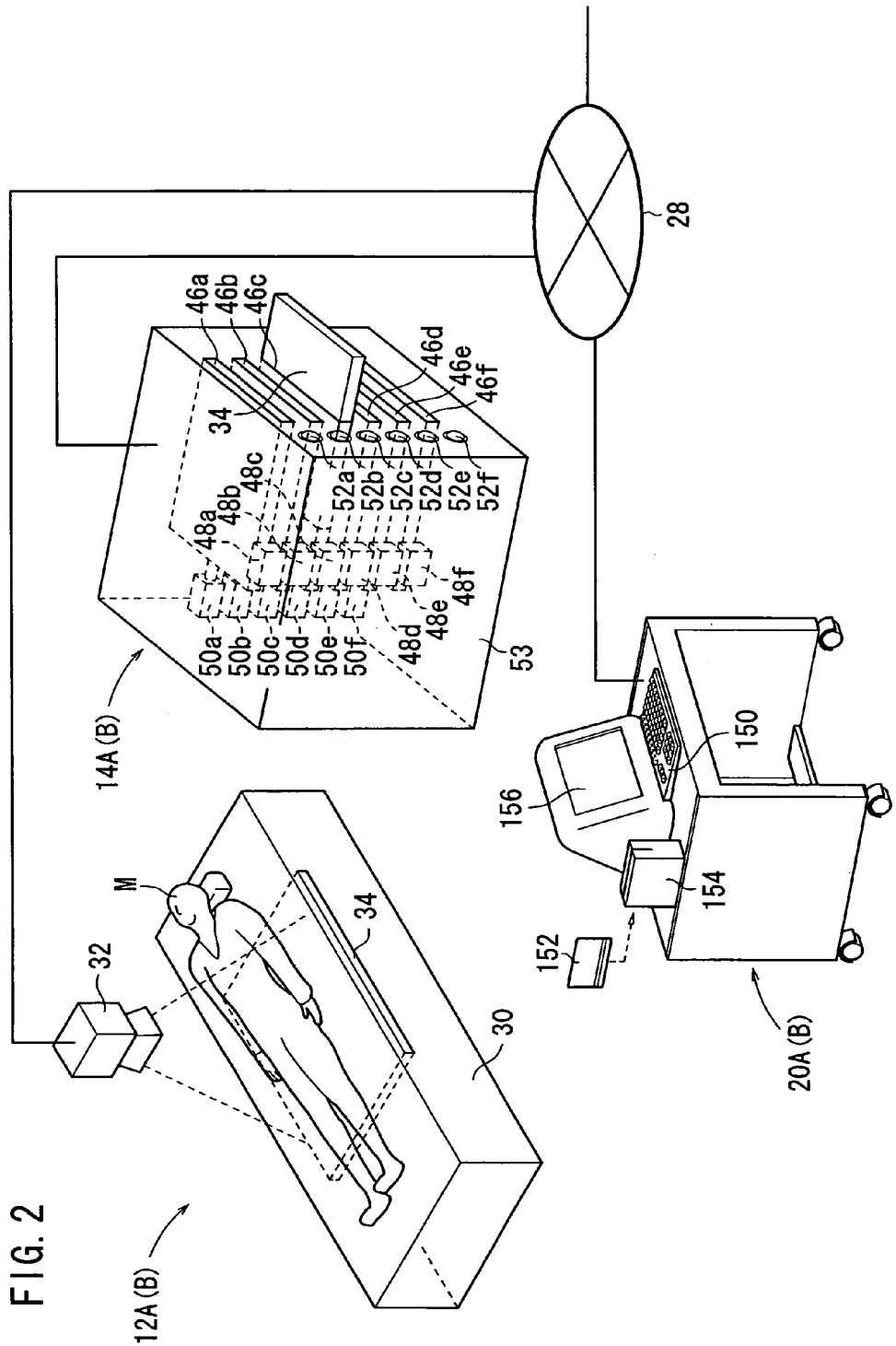
FIG. 2 is a schematic view of a radiation image capturing apparatus, a cassette storage apparatus, and an information managing apparatus of the radiation image information recording and reading system.
Figure 3:
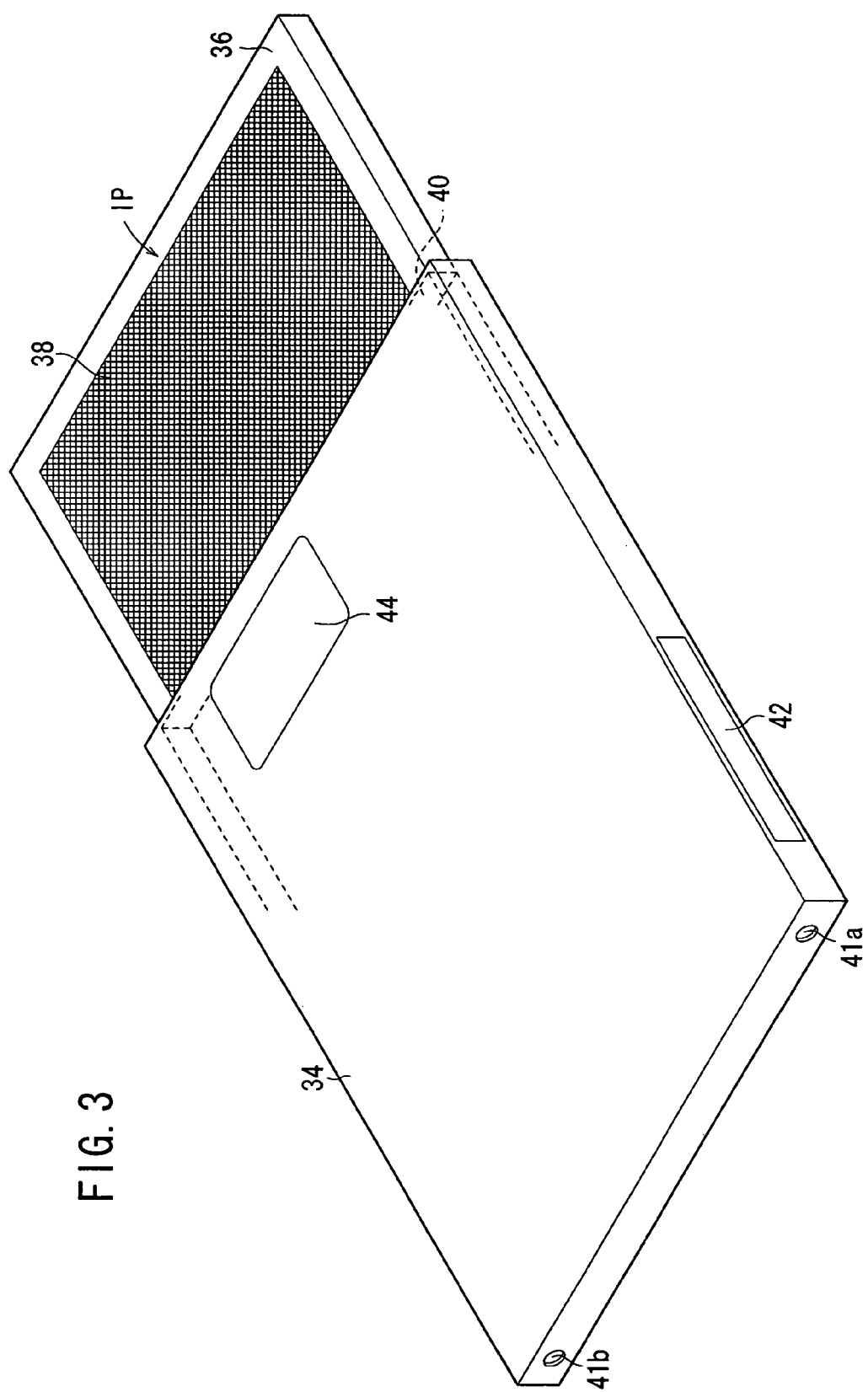
FIG. 3 is a perspective view of a stimulable phosphor sheet and a cassette that are loaded into the radiation image capturing apparatus and a radiation image reading apparatus of the radiation image information recording and reading system.

Each of the radiation image capturing apparatus 12A, 12B comprises an X-ray imaging apparatus, and, as shown in FIG. 2, has an imaging table 30 for positioning the subject M thereon and an X-ray source 32 for applying X-rays to the subject M on the imaging table 30. The imaging table 30 is loaded with a cassette 34 housing a stimulable phosphor sheet IP (image recording medium) therein, as shown in FIG. 3. Other image capturing apparatus such as a CT (Computed Tomography) apparatus, an MRI (Magnetic Resonance Imaging) apparatus, etc. may also be connected to the network 28.

The stimulable phosphor sheet IP may be in the form of a hard sheet comprising a support base 36 made of a hard material such as glass or the like and a stimulable phosphor sheet layer 38 in the shape of columns evaporated thereon. The stimulable phosphor sheet layer 38 may be formed by a vacuum evaporation process which heats a stimulable phosphor in a vacuum container to evaporate the stimulable phosphor and deposit same on the support base 36, a sputtering process, a CVD (Chemical Vapor Deposition) process, or an ion plating process. In the stimulable phosphor sheet layer 38 thus formed, the stimulable phosphor is in the form of columns extending substantially perpendicularly to the plane of the stimulable phosphor sheet IP. The columns of the stimulable phosphor sheet layer 38 are optically independent of each other, highly sensitive to radiations applied thereto, can lower the granularity of images recorded therein, and can reduce the dispersion of stimulating light for reproducing clear images.

The stimulable phosphor sheet IP is not limited to the hard sheet comprising the hard support base 36 and the stimulable phosphor sheet layer 38 formed thereon, but may be a stimulable phosphor sheet comprising a flexible support base coated with a stimulable phosphor.

The cassette 34 has an opening 40 defined in an end thereof for inserting the stimulable phosphor sheet IP therethrough into the cassette 34, and also has a pair of insertion holes 41a, 41b defined in the opposite end thereof for inserting pins therein to eject the stimulable phosphor sheet IP from the opening 40. On one side face of the cassette 34, there is disposed a medium information recording element 42 such as a bar code, an IC chip, or the like which has recorded medium information that comprises type information including the size, sensitivity, type, etc. of the stimulable phosphor sheet IP housed in the cassette 34, and identification information including a cassette number which identifies the cassette 34. The cassette 34 supports, on its front face closer to the stimulable phosphor sheet layer 38 of the stimulable phosphor sheet IP housed in the cassette 34, an indicator 44 which indicates the type information of the stimulable phosphor sheet IP housed in the cassette 34 and the identification information of the cassette 34.

As shown in FIG. 2, each of the cassette storage apparatus 14A, 14B comprises a plurality of storage bins 46a through 46f for storing respective cassettes 34 each housing a stimulable phosphor sheet IP, a plurality of medium information reading units 48a through 48f (medium information acquiring units) such as bar-code readers or the like associated with the respective storage bins 46a through 46f for reading the medium information recorded in the medium information recording elements 42 on the stored cassettes 34, a plurality of cassette ejectors 50a through 50f such as solenoids or the like associated with the respective storage bins 46a through 46f for ejecting one of the stored cassettes 34 which has been selected by the information managing apparatus 18 or the ID terminals 20A, 20B, and a plurality of display elements 52a through 52f such as LEDs or the like associated with the respective storage bins 46a through 46f for indicating the position of one of the storage bins 46a through 46f which stores the selected cassette 34. These components of each of the cassette storage apparatus 14A, 14B are enclosed by a casing 53 which is made of a material containing a heavy metal such as lead or the like for protecting the stored cassettes 34 from exposure to radiations.

Figure 4:
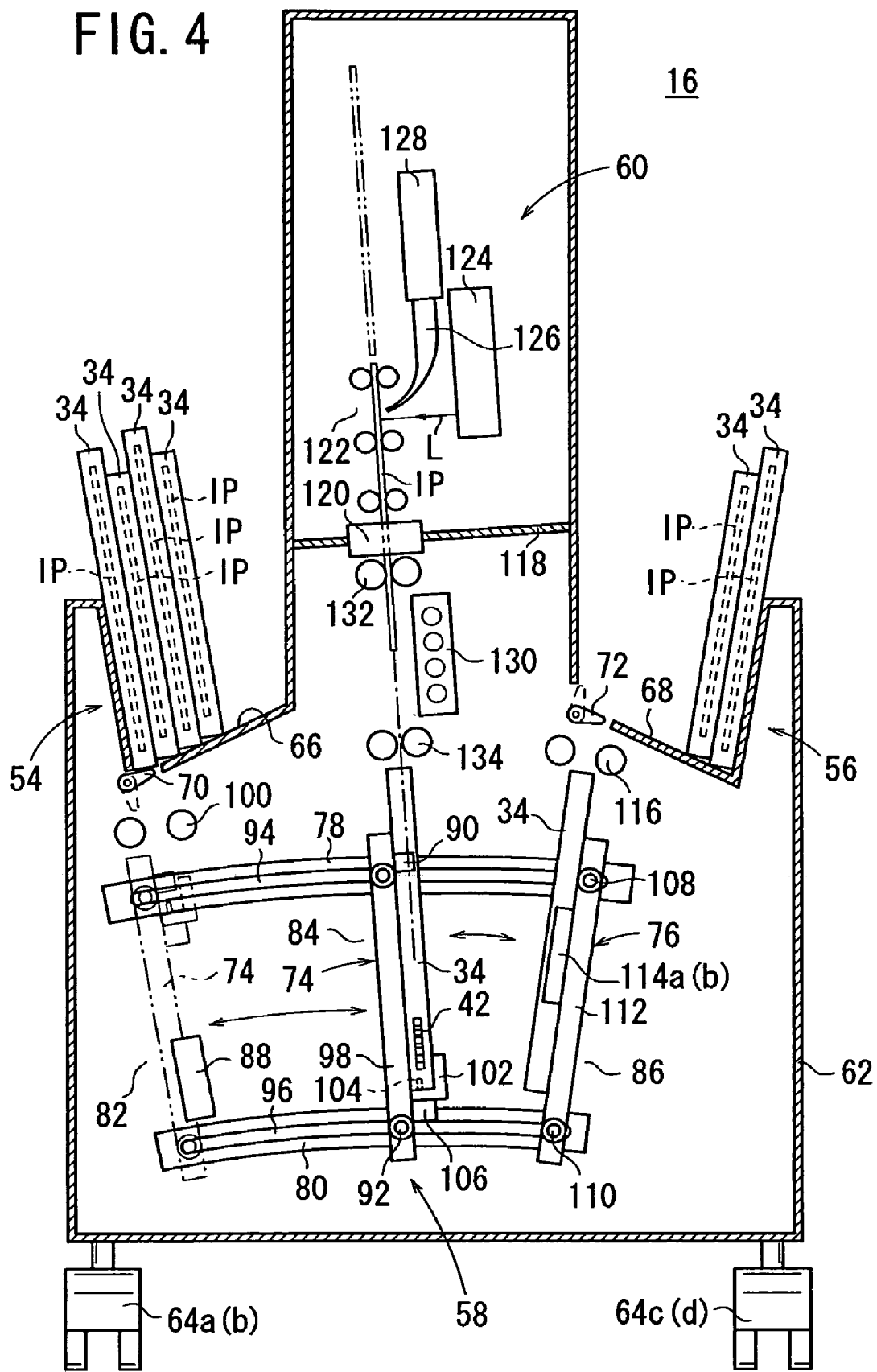
FIG. 4 is a vertical cross-sectional view of the radiation image reading apparatus.

FIG. 4 shows structural details of the radiation image reading apparatus 16 in cross section. The radiation image reading apparatus 16 reads radiation image information recorded on the stimulable phosphor sheet IP ejected from a cassette 34, thereafter erases any remaining radiation image information from the stimulable phosphor sheet IP, inserts the stimulable phosphor sheet IP back into the cassette 34, and discharges the cassette 34.

The radiation image reading apparatus 16 comprises a cassette loader 54 for loading a plurality of cassettes 34 housing respective stimulable phosphor sheets IP, a cassette unloader 56 for unloading a plurality of cassettes 34 housing respective stimulable phosphor sheets IP that have been processed, a cassette feeder 58 for feeding a cassette 34 between the cassette loader 54 and the cassette unloader 56, and a main unit 60 for reading recorded radiation image information from the stimulable phosphor sheet IP ejected from the cassette 34 and erasing remaining radiation image information from the stimulable phosphor sheet IP. The cassette loader 54 and the cassette unloader 56 are positioned respectively forward and rearward of the main unit 60. The radiation image reading apparatus 16 has a casing 62 enclosing the components thereof, and is movable on casters 64a through 64d. If the radiation image reading apparatus 16 is located in the vicinity of the radiation image capturing apparatus 12A, 12B, then the casing 62 should desirably be made of a material containing a heavy metal such as lead or the like for protecting the cassettes 34 from exposure to radiations, similarly to the casing 53 enclosing the cassette storage apparatus 14A, 14B.

The cassette loader 54 and the cassette unloader 56 have respective bottom panels 66, 68 inclined to a horizontal plane for supporting cassettes 34 to be loaded thereon and cassettes 34 unloaded thereon. The inclined bottom panel 66 has an opening defined in its lowermost portion and normally closed by a lid 70 disposed therein. When a cassette 34 near the lid 70 is detected, the lid 70 is turned to open the opening. Similarly, the inclined bottom panel 68 has an opening defined in its uppermost portion and normally closed by a lid 72 disposed therein. When a cassette 34 near the lid 72 is detected, the lid 72 is turned to open the opening.

The cassette feeder 58 has a first processing mechanism 74 and a second processing mechanism 76 for holding a cassette 34 supplied from the cassette loader 54. The first processing mechanism 74 is guided by upper and lower guide members 78, 80 and reciprocally movable between a first processor 82 disposed below the cassette loader 54 and a second processor 84 disposed below the main unit 60. The second processing mechanism 76 is guided by the upper and lower guide members 78, 80 and reciprocally movable between the second processor 84 disposed below the main unit 60 and a third processor 86 disposed below the cassette unloader 56. The first processor 82 has a medium information reader 88 such as a bar-code reader or the like for reading the medium information recorded on the medium information recording element 42 on the side face of a cassette 34 that has been supplied from the cassette loader 54.

The first processing mechanism 74 has a support plate 98 movably supported on the guide members 78, 80 by support shafts 90, 92 that are mounted respectively on upper and lower ends of the support plate 98 and ride in respective guide grooves 94, 96 defined in the respective upper and lower guide members 78, 80. The support plate 98 supports thereon a vertically movable support member 102 for supporting the lower end of a cassette 34 which has been supplied from the cassette loader 54 by a pair of nip rollers 100, and a solenoid 106 for inserting pins 104 respectively into the insertion holes 41*a*, 41*b* in the cassette 34 to eject the stimulable phosphor sheet IP from the cassette 34.

The second processing mechanism 76 has a support plate 112 movably supported on the guide members 78, 80 by support shafts 108, 110 that are mounted respectively on upper and lower ends of the support plate 112 and ride in the respective guide grooves 94, 96 of the upper and lower guide members 78, 80. The support plate 112 supports thereon vertically movable grip plates 114*a*, 114*b* for griping opposite sides of a cassette 34 that is fed by the first processing mechanism 74. The second processing mechanism 76 unloads a cassette 34 into the cassette unloader 56 through a pair of nip rollers 116 disposed above the third processor 86.

The main unit 60 is isolated from the cassette feeder 58 disposed therebelow by a partition wall 118. The main unit 60 is shielded against entry of light by the partition wall 118 that has a shutter mechanism 120 through which a stimulable phosphor sheet IP can be taken into and out of the main unit 60. The shutter mechanism 120 may comprise a shutter mechanism which is selectively opened and closed when a stimulable phosphor sheet IP moves into and out of the main unit 60, or a light-shielding member which slidably contacts a stimulable phosphor sheet IP as it moves into and out of the main unit 60.

A linear reading feed path 122 extending substantially upwardly is disposed in the main unit 60. The main unit 60 accommodates therein a stimulating light scanner 124 disposed substantially centrally at the linear reading feed path 122 for applying a stimulating light beam L, which comprises a laser beam, as it sweeps in a main scanning direction to a stimulable phosphor sheet IP which is being fed in an auxiliary scanning direction that extends perpendicularly to the main scanning direction. A light guide 126 for collecting light emitted from the stimulable phosphor sheet IP has an end positioned closely to a main scanning line on the stimulable phosphor sheet IP by the stimulating light L. The other end of the light guide 126 is connected to a photoelectric transducer 128 such as a photomultiplier or the like for converting light collected by the light guide 126 into an electric signal.

An erasure unit 130 for erasing remaining radiation image information on a stimulable phosphor sheet IP is disposed between the main unit 60 and the second processor 84. The erasure unit 130 has a plurality of light sources such as halogen lamps or the like for emitting erasure light. Pairs of nip rollers 132, 134 are disposed above and below the erasure unit 130 for feeding a stimulable phosphor sheet IP between the main unit 60 and the second processor 84.

As shown in FIG. 1, the information managing apparatus 18 comprises an information input unit 136 (subject information setting unit) for entering ID information about the subject M and subject information such as imaging information about radiation image information as related to the ID information, an information transmission/reception unit 138 for transmitting information to and receiving information from the various apparatus connected to the information managing apparatus 18 through the network 28, a subject information storage unit 140 for storing subject information entered from the information input unit 136 or supplied from the ID terminals 20A, 20B, a medium information storage unit 142 for storing medium information supplied from the cassette storage apparatus 14A, 14B, an image information storage unit 144 for temporarily storing radiation image information read by the radiation image reading apparatus 16, a display unit 146 for displaying radiation image information and information necessary to process the radiation image information, and an information processing unit 148 (image recording medium selector, associative relationship setting unit) for setting an associative relationship between the medium information of a selected cassette 34 and the subject information.

The subject information includes ID information for identifying the subject M, such as the name, gender, date of birth, ID number (e.g., the ID number of the subject M registered in a hospital or the like), etc. of the subject M, and imaging information such as the date when the radiation image information of the subject M is captured, the body region of the subject M which is imaged, the imaging process used, the size of a stimulable phosphor sheet IP used in the imaging process, the sensitivity of stimulable phosphor sheet IP used in the imaging process, etc.

The medium information includes type information about stimulable phosphor sheets IP, such as the sizes, sensitivities, types, etc. of the stimulable phosphor sheets IP that are read from the medium information recording elements 42 of the cassettes 34 by the medium information reading units 48*a* through 48*f* in the cassette storage apparatus 14A, 14B, identification information such as cassette numbers or the like that are read from the medium information recording elements 42 to identify the cassettes 34 that houses the stimulable phosphor sheets IP, and storage position information of the storage bins 46*a* through 46*f* which are loaded with the cassettes 34 in the cassette storage apparatus 14A, 14B. The storage position information may be acquired as positional information of the medium information reading units 48*a* through 48*f* associated with the respective storage bins 46*a* through 46*f*.

As shown in FIG. 2, each of the ID terminals 20A, 20B comprises a terminal device having a keyboard 150 for entering subject information, an ID information reader 154 for reading ID information from an ID card 152 such as a magnetic card, an IC card, or the like which has registered the ID information of the subject M, and a display unit 156. The ID terminals 20A, 20B may be disposed in the vicinity of the radiation image capturing apparatus 12A, 12B.

The image output apparatus 22 outputs radiation image information read by the radiation image reading apparatus 16 as a visible image on a high resolution display or on a recording medium such as a film, for diagnosis of the subject.

The image saving apparatus 24 saves radiation image information together with subject information and medium information which are associated with the radiation image information. The workstation 26 has a function to retrieve desired radiation image information from the radiation image information which is stored mainly in the image saving apparatus 24, displays the retrieved radiation image information, and outputs the radiation image information, if necessary, through the image output apparatus 22.

The radiation image information recording and reading system 10 according to the embodiment of the present invention is basically constructed as described above. Now, operation of the radiation image information recording and reading system 10 will be described below.

First, a process of selecting a desired cassette 34 and recording radiation image information on the stimulable phosphor sheet IP in the selected cassette 34 will be described below with reference to a flowchart shown in FIG. 5.

Cassettes 34 housing respective stimulable phosphor sheets IP which have various sizes, sensitivities, types, etc. are prepared and loaded into the respective storage bins 46a through 46f in the cassette storage apparatus 14A, 14B in step S1. It is assumed that the type information of the stimulable phosphor sheets IP housed in the cassettes 34 and the identification information such as cassette numbers or the like of the cassettes 34 are recorded in the form of bar codes as the medium information recording element 42 on the side faces of the cassettes 34.

When the cassettes 34 are loaded into the cassette storage apparatus 14A, 14B, the medium information reading units 48a through 48f are energized to read the medium information from the medium information recording element 42 on the side faces of the cassettes 34 in step S2. The medium information thus read and the storage position information of the cassettes 34 are stored in the medium information storage unit 142 in step S3.

Specifically, when the cassettes 34 are loaded into the respective storage bins 46a through 46f in the cassette storage apparatus 14A, 14B, the medium information reading units 48a through 48f read the type information of the stimulable phosphor sheets IP and the identification information of the cassettes 34 which are recorded in the medium information recording element 42 on the cassettes 34, and send the read information together with the storage position information through the network 28 to the information managing apparatus 18. The information processing unit 148 of the information managing apparatus 18 receives medium information, which is made up of the type information, the identification information, and the storage position information, through the information transmission/reception unit 138, and stores the received medium information in the medium information storage unit 142.

If there is a request to image the subject M from a doctor or the like in step S4, then the operator of the radiation image information recording and reading system 10 enters subject information using the ID terminals 20A, 20B or the information managing apparatus 18 that is located near the radiation image capturing apparatus 12A, 12B which image the subject M in step S5. For example, at the ID terminals 20A, 20B, the operator operates the ID information reader 154 to read the ID information for identifying the subject M, such as the name, gender, date of birth, ID number, etc. of the subject M from the ID card 152, and enters imaging information such as the date when the radiation image information of the subject M is captured, the body region of the subject M which is imaged, the imaging process used, the size of a stimulable phosphor sheet IP used in the imaging process, the sensitivity of stimulable phosphor sheet IP used in the imaging process, etc. from the keyboard 150. The operator may alternatively enter subject information, which is made up of the ID information and the imaging information, using the information input unit 136 of the information managing apparatus 18.

The entered subject information is stored into the subject information storage unit 140 by the information processing unit 148 of the image processing apparatus 18 in step S6. Before the subject M is imaged, a plurality of items of subject information about a plurality of subjects M may successively be entered and stored into the subject information storage unit 140.

Then, the image processing unit 148 selects the subject information of the patient M to be imaged from all the subject information stored in the subject information storage unit 140, and searches for the cassette 34 which houses the stimulable phosphor sheet IP that matches the imaging information of the subject information in step S7.

Specifically, the image processing unit 148 searches for the identification information where the size and sensitivity of the stimulable phosphor sheet IP which are represented by the subject information stored in the subject information storage unit 140 and the size and sensitivity of the stimulable phosphor sheet IP which are represented by the medium information stored in the medium information storage unit 142 match each other. Then, the image processing unit 148 identifies the storage position of the cassette 34 from the storage position information of the cassette 34 with the matching identification information. The storage position information may be determined by establishing, in advance, a table of imaging body regions represented by imaging information and type information of stimulable phosphor sheets IP, and searching the table for identification information such as a cassette number or the like based on an imaging body region.

When the storage position information of the cassette 34 is determined, the identification information such as the cassette number or the like of the cassette 34 and the subject information are associated with each other, and are stored in the image information storage unit 144 in step S8. In this case, the subject information of the subject M is automatically associated with the identification information of the cassette 34 which has been acquired by the medium information reading units 48a through 48f in the cassette storage apparatus 14A, 14B. Therefore, the operator is not required to read the medium information recorded in the medium information recording element 42 on the stored cassette 34.

After the storage position information of the cassette 34 which matches the subject M to be imaged is found, the information managing apparatus 18 actuates one of the cassette ejectors 50a through 50f which is combined with the storage bin that houses the cassette 34, based on the storage position information, to eject the cassette 34 from the cassette storage apparatus 14A, 14B in step S9. One of the display elements 52a through 52f which is positioned laterally of the storage bin that houses the cassette 34 is turned on, clearly indicating the position of the ejected cassette 34 to the operator.

The operator then removes the cassette 34 ejected from the cassette storage apparatus 14A, 14B, and then loads the cassette 34 into the imaging table 30 of the radiation image capturing apparatus 12A, 12B in step S10. At this time, the operator can reliably supply the cassette 34 housing the stimulable phosphor sheet IP that matches the subject M to the radiation image capturing apparatus 12A, 12B without a mistake. Then, the X-ray source 32 is energized to apply X-rays through the subject M to the stimulable phosphor sheet IP in the cassette 34, capturing radiation image information of the subject M in step S11.

The operator may possibly fail to immediately load the cassette 34 ejected from the cassette storage apparatus 14A, 14B into the radiation image capturing apparatus 12A, 12B. As a countermeasure against such a situation, the cassette storage apparatus 14A, 14B may have a cassette ejection button, and the operator may press the cassette ejection button to eject the cassette 34 when it is to be loaded into the radiation image capturing apparatus 12A, 12B. In this manner, the stimulable phosphor sheet IP in the cassette 34 is protected from unexpected exposure to X-rays.

When a cassette 34 is selected by the information managing apparatus 18, the indicator 44 of the cassette 34 may display the subject information including the name of the subject M to be imaged. With the indicator 44 displaying the subject information of the subject M, the cassette 34 can be loaded, without an error, into the radiation image capturing apparatus 12A, 12B by which the subject M is to be imaged, for capturing radiation image information of the subject M. This is particularly effective in an application wherein a plurality of items of subject information are entered together and a plurality of cassettes 34 are selected for the respective subjects M. The subject information may also be displayed on the cassette storage apparatus 14A, 14B.

The cassette 34 with the radiation image information recorded on the stimulable phosphor sheet IP housed therein is removed from the radiation image capturing apparatus 12A, 12B, carried by the operator to the radiation image reading apparatus 16, which then reads the recorded radiation image information from the stimulable phosphor sheet IP. A process of reading the recorded radiation image information from the stimulable phosphor sheet IP will be described below with reference to FIG. 4 and a flowchart shown in FIG. 6.

The cassette 34 with the radiation image information recorded on the stimulable phosphor sheet IP housed therein is loaded into the cassette loader 54 in step S21. The cassette loader 54 can be loaded with a plurality of cassettes 34 with their openings 40 directed upwardly.

The cassettes 34 loaded in the cassette loader 54 are stacked along the inclined bottom panel 66. The lowermost one of the stacked cassettes 34 is introduced through the opening in the bottom panel 66 which has been opened by the lid 70 into the radiation image reading apparatus 16.

The cassette 34 introduced into the radiation image reading apparatus 16 is gripped and fed by the nip rollers 100, and then held by the support plate 98 and the support member 102 of the first processing mechanism 74 that has been waiting in the first processor 82. At this time, the medium information reader 88 disposed in the first processor 82 reads the medium information recorded on the medium information recording element 42 on the side face of the cassette 34 in step S22.

The first processing mechanism 74 which is holding the cassette 34 is guided by the guide members 78, 80 and fed to the second processor 84. Thereafter, the solenoid 106 mounted on the support member 102 is energized to insert the pins 104 into the insertion holes 41a, 41b defined in the lower end of the cassette 34, making the upper end of the stimulable phosphor sheet IP project from the opening 40 in the upper end of the cassette 34.

The stimulable phosphor sheet IP thus projecting from the cassette 34 is gripped by the nip rollers 134 and supplied through the erasure unit 130, the nip rollers 132, and the shutter mechanism 120 to the main unit 60. The cassette 34, from which the stimulable phosphor sheet IP has been removed, has its opposite sides gripped by the grip plates 114a, 114b of the second processing mechanism 76, and is transferred from the first processing mechanism 74 to the second processing mechanism 76. Having transferred the cassette 34 to the second processing mechanism 76, the first processing mechanism 74 moves back to the first processor 82 for receiving a next cassette 34 from the cassette loader 54.

The stimulable phosphor sheet IP as it is supplied to the main unit 60 is fed upwardly along the feed path 122 into an upper region of the main unit 60, and then fed downwardly along the feed path 122 during which time the recorded radiation image information is read from the stimulable phosphor sheet IP in step S23. Specifically, the stimulating light L emitted from stimulating light scanner 124 scans the stimulable phosphor sheet IP in a direction perpendicular to the direction in which the stimulable phosphor sheet IP is fed, and light emitted from the stimulable phosphor sheet IP upon exposure to the stimulating light L is guided by the light guide 126 to the photoelectric transducer 128, which produces an electric signal representative of the recorded radiation image information.

The radiation image information represented by the electric signal is transmitted, together with the medium information of the cassette 34 which has been read by the medium information reader 88, through the network 28 to the information managing apparatus 18 in step S24. In the information managing apparatus 18, the information processing unit 148 checks the identification information of the cassette 34 which is included in the medium information ancillary to the radiation image information received through the information transmission/reception unit 138, against the identification information stored in the image information storage unit 144 in step S8, in step S25. The information processing unit 148 then stores the radiation image information in relation to the subject information associated with the matching identification information, into the image information storage unit 144 in step S26. The radiation image information stored in the image information storage unit 144 is transmitted, together with the subject information, to the image saving apparatus 24 where it is saved.

After the reading of the radiation image information has been completed, the stimulable phosphor sheet IP is delivered through the shutter mechanism 120 into the erasure unit 130, which erases remaining radiation image information from the stimulable phosphor sheet IP in step S27. The stimulable phosphor sheet IP from which the remaining radiation image information has been erased is stored back into the cassette 34 that is held by the second processing mechanism 76 that has been waiting in the second processor 84. Thereafter, the cassette 34 with the stimulable phosphor sheet IP stored therein is guided by the guide members 78, 80 and moved to the third processor 86. Then, the cassette 34 is unloaded through the nip rollers 116 into the cassette unloader 56 when the opening in the bottom panel 68 is opened by the lid 72 in step S28.

The cassette 34 unloaded into the cassette unloader 56 is carried by the operator to the cassette storage apparatus 14A, 14B, and placed in an empty one of the storage bins 46a through 46f so as to wait for a next image capturing process.

The workstation 26 may retrieve radiation image information saved in the image saving apparatus 24 using subject information as a retrieval key, output the retrieved radiation image information from the image output apparatus 22 for diagnostic purpose or the like.

In the above embodiment, cassettes 34 and stimulable phosphor sheets IP are kept in one-to-one correspondence, and the type information of the stimulable phosphor sheets IP stored in the cassettes 34 is recorded on the medium information recording elements 42 of the cassettes 34. However, type information of stimulable phosphor sheets IP and identification information which identifies the stimulable phosphor sheets IP may be recorded on the stimulable phosphor sheets IP in a manner to be detectable from outside of the cassettes 34, and the type information and the identification information which are thus recorded may be read and processed. Such a modification is economical as a common cassette 34 may be used with a plurality of stimulable phosphor sheets IP, and is also applicable to stimulable phosphor sheets IP which do not need to be stored in cassettes 34.

Alternatively, medium information may be recorded on both stimulable phosphor sheets IP and cassettes 34, and the stimulable phosphor sheets IP and the cassettes 34 may be used in a desired combination.

In the above embodiment, the cassette 34 has the opening 40 defined in one end thereof and the stimulable phosphor sheet IP is insertable into and removable from the cassette 34 through the opening 40. However, the principles of the present invention are also applicable to a cassette having a lid that is openable and closable for inserting a stimulable phosphor sheet IP into and removing a stimulable phosphor sheet IP from the cassette, or a unitary-type cassette having a protective cover that can be attached to and removed from the surface of a stimulable phosphor sheet IP for recording radiation image information thereon.

The stimulable phosphor sheet. IP supplied to the radiation image capturing apparatus 12A, 12B is unloaded from the radiation image reading apparatus 16. Therefore, the cassette storage apparatus 14A, 14B, rather than the cassette unloader 56, may be integrally combined with the radiation image reading apparatus 16, or the cassette unloader 56 may have a mechanism corresponding to the medium information reading units 48a through 48f and the cassette ejectors 50a through 50f of the cassette storage apparatus 14A, 14B. With such modifications, the process of manually removing the cassette 34 which has been processed in the radiation image reading apparatus 16 and loading the removed cassette 34 into the cassette storage apparatus 14A, 14B may be dispensed with.

Although a certain preferred embodiment of the present invention has been shown and described in detail, it should be understood that various changes and modifications may be made therein without departing from the scope of the appended claims.

What is claimed is:

1. A method of managing an image recording medium, comprising the steps of:
    storing a plurality of image recording mediums in an image recording medium storage;
    acquiring medium information including type information of the image recording mediums stored in the image recording medium storage and identification information for identifying the image recording mediums, from said image recording medium storage;
    setting subject information of a subject with respect to image information to be recorded on the image recording mediums;
    selecting one of the image recording mediums which has said type information that matches said subject information which has been set; and
    setting an associative relationship between said identification information of the selected image recording medium and said subject information.

2. A method according to claim 1, wherein said medium information includes positional information of the image recording mediums stored in said image recording medium storage, further comprising the step of:
    selecting the image recording medium based on said positional information of the image recording medium which has said type information that matches said subject information which has been set.

3. A method according to claim 1, wherein said medium information includes size information of said image recording mediums as said type information.

4. A method according to claim 1, wherein said medium information includes sensitivity information of said image recording mediums as said type information.

5. A method according to claim 1, wherein said subject information includes ID information of said subject.

6. A method according to claim 1, wherein said subject information includes imaging information with respect to image information of said subject.

7. An apparatus for managing an image recording medium, comprising:
    an image recording medium storage for storing a plurality of image recording mediums;
    medium information acquiring units for acquiring medium information including type information of the image recording mediums stored in the image recording medium storage and identification information for identifying the image recording mediums, from said image recording medium storage;
    a subject information setting unit for setting subject information of a subject with respect to image information to be recorded on the image recording mediums;
    an image recording medium selector for selecting one of the image recording mediums which has said type information that matches said subject information which has been set; and
    an associative relationship setting unit for setting an associative relationship between said identification information of the selected image recording medium and said subject information.

8. An apparatus according to claim 7, wherein said medium information acquiring units have information readers for reading said type information and said identification information which are recorded on said image recording mediums.

9. An apparatus according to claim 7, wherein said image recording mediums are stored in respective cassettes which are stored in said image recording medium storage.

10. An apparatus according to claim 9, wherein said medium information acquiring units have information readers for reading said type information and said identification information which are recorded on said cassettes.

11. An apparatus according to claim 7, wherein said image recording medium storage is disposed closely to an image recording apparatus for recording image information on said image recording mediums.

12. An apparatus according to claim 7, wherein said image recording medium storage is disposed integrally with an image reading apparatus for reading recorded image information from said image recording mediums.

13. An apparatus according to claim 7, wherein said medium information includes positional information of the image recording mediums stored in said image recording medium storage.

14. An apparatus according to claim 7, wherein said medium information includes size information of said image recording mediums as said type information.

15. An apparatus according to claim 7, wherein said medium information includes sensitivity information of said image recording mediums as said type information.

16. An apparatus according to claim 7, wherein said subject information includes ID information of said subject.

17. An apparatus according to claim 7, wherein said subject information includes imaging information with respect to image information of said subject.

18. An apparatus according to claim 7, wherein said image recording medium storage has ejectors for ejecting the image recording medium selected by said image recording medium selector.

19. An apparatus according to claim 7, wherein said image recording medium storage has display elements for indicating a storage position of the image recording medium selected by said image recording medium selector.

\* \* \* \* \*